US007562363B1

United States Patent
Belair et al.

(10) Patent No.: US 7,562,363 B1
(45) Date of Patent: Jul. 14, 2009

(54) GANG SCHEDULING AMONG ONE OR MORE COMPONENTS OR SYSTEMS

(75) Inventors: Stephen Paul Belair, Santa Cruz, CA (US); David Delano Ward, Somerset, WI (US); Sudhakar Mamillapalli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 884 days.

(21) Appl. No.: 10/722,314

(22) Filed: Nov. 25, 2003

(51) Int. Cl.
*G06F 9/46* (2006.01)
(52) U.S. Cl. .................................................... 718/102
(58) Field of Classification Search ................. 714/789; 718/102
See application file for complete search history.

(56) References Cited
U.S. PATENT DOCUMENTS

| | | | |
|---|---|---|---|
| 5,161,153 A | 11/1992 | Westmore | |
| 5,541,927 A | 7/1996 | Kristol et al. | |
| 5,949,780 A | 9/1999 | Gopinath | |
| 5,959,989 A | 9/1999 | Gleeson et al. | |
| 6,032,190 A | 2/2000 | Bremer et al. | |
| 6,122,483 A | 9/2000 | Lo et al. | |
| 6,415,312 B1 | 7/2002 | Boivie | |
| 6,418,477 B1 | 7/2002 | Verma | |
| 6,532,211 B1 | 3/2003 | Rathonyi et al. | |
| 6,683,850 B1 | 1/2004 | Dunning et al. | |
| 6,724,729 B1* | 4/2004 | Sikdar | 370/241 |
| 6,735,177 B1 | 5/2004 | Suzuki | |
| 6,760,307 B2 | 7/2004 | Dunning et al. | |
| 7,207,040 B2* | 4/2007 | Boudnik et al. | 718/103 |
| 2002/0085506 A1 | 7/2002 | Hundscheidt et al. | |
| 2003/0076826 A1 | 4/2003 | Blasiak et al. | |
| 2003/0097425 A1* | 5/2003 | Chen | 709/220 |

(Continued)

FOREIGN PATENT DOCUMENTS
EP   1 085 723 A2   3/2001

(Continued)

OTHER PUBLICATIONS

U.S. Appl. No. 10/721,939, filed Nov. 25, 2003, Mamillapalli et al.

(Continued)

*Primary Examiner*—Meng-Ai An
*Assistant Examiner*—Mengyao Zhe
(74) *Attorney, Agent, or Firm*—The Law Office of Kirk D. Williams

(57) ABSTRACT

Disclosed are mechanisms for initiating and performing tasks by a gang of members. A member of a gang identifies an event or other condition which requires notification to and/or action to be taken by at least a subset, if not all the other members of the gang. The gang member notifies other gang members by sending a message, such as that using reliable group communication using multicast and/or unicast messages. The information notified to other gang members and/or actions to be performed are extensible to meet the needs of the wide-variety of possible applications. A small list of example subject areas of these applications includes collecting, distributing, updating, responding to, and/or other processing of error conditions, routing information (e.g., between systems, from a route processor to line cards within a system, etc.), configuration information, flow control information, statistics or other values, etc.

17 Claims, 10 Drawing Sheets

U.S. PATENT DOCUMENTS

| | | |
|---|---|---|
| 2003/0223422 A1 | 12/2003 | Igarashi et al. |
| 2004/0081149 A1 | 4/2004 | Belair et al. |
| 2005/0002365 A1 | 1/2005 | Xu |
| 2005/0111452 A1 | 5/2005 | Mamillapalli et al. |

FOREIGN PATENT DOCUMENTS

| | | |
|---|---|---|
| EP | 1 085 723 A3 | 3/2001 |
| WO | WO 02/09307 A1 | 1/2002 |
| WO | WO 02/039667 A2 | 5/2002 |
| WO | WO 02/039667 A3 | 5/2002 |

OTHER PUBLICATIONS

Helen D. Karatza, A Simulation-Based Performance Analysis of Gang Scheduling in a Distributed System, Department of Informatics, Aristotle University of Thessaloniki, 54006 Thessaloniki, Greece.

Da Silva et al., Improvements in Parallel Job Scheduling Using Gang Service, Laboratoire ASIM, LIP6, Université Pierre et Marie Curie, Paris, France, Dept. Of Information and Comp. Science, University of California, Irvine, CA 92697, U.S.A.

Wiseman et al., Paired Gang Scheduling, IEEE Transactions on Parallel and Distributed Systems, vol. 14, No. 6, Jun. 2003.

Frachtenberg et al., Gang Scheduling with Lightweight User-Level Communication, IEEE Proceedings of the 2001 International Conference on Parallel Processing Workshops.

Zhang et al., Improving Parallel Job Scheduling by Combining Gang Scheduling and Backfilling Techniques, Department of Computer Science & Engineering, The Pennsylvania State University, University Park PA 16802, U.S.A., IEEE, 0-7695-0574-0, 2000.

Franke et al., Gang Scheduling for Highly Efficient Distributed Multiprocessor Systems, Proceedings of the 6th Symposium on the Frontiers of Massively Parallel Computation, IEEE, 1996.

Helen D. Karatza, Gang Scheduling Performance on a Cluster of Non-Dedicated Workstations, Proceedings of the 35th Annual Simulation Symposium, IEEE, 2002.

Coulouris et al., Distributed Systems Concepts and Design, Third Edition, Addison-Wesley, Sect. 4.5.1, pp. 154-158, Ch. 11, pp. 419-464, 2001.

* cited by examiner

GANG SCHEDULING AMONG ONE OR MORE COMPONENTS OR SYSTEMS

TECHNICAL FIELD

One embodiment of the invention relates to communications and computer systems; and more particularly, one embodiment especially relates to gang scheduling among one or more components in one or more systems, such as, but not limited to gang members in routers, packet switching systems, computer systems, and other devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

In loosely-coupled, asynchronous, distributed systems, there are scenarios which require the simultaneous scheduling of associated processes running on different nodes of the networked system. Because the nodes are loosely coupled, this represents a challenge as the nodes are not synchronized and run independent schedulers (i.e., the overall system is asynchronous). In such a system, there is no centralized operating system nor master scheduler presence.

This presents a problem if there are system-wide events that require the simultaneous cooperation of processes on different asynchronous nodes. Because the nodes are asynchronous, it is not inherently possible to simultaneously schedule processes on different nodes. Therefore, there needs to be a scheduling component in the system that is able to guarantee that cooperating processes (i.e., a gang) are simultaneously dispatched on different nodes in a timely manner.

An example of a gang is a set of threads, processes, or activities that execute at the same time on different processors, typically in different systems. In gang scheduling, all the threads of gang are scheduled to execute at the same time. Gang scheduling among asynchronous systems is a difficult problem.

Known implementations for gang scheduling face numerous problems. For example, a message which affects the scheduling of the gang (i.e., a message that dispatches or activates the gang members) typically must be delivered reliably to the nodes containing gang members and acted upon at the same time. Because each node is running an independent scheduler (e.g., asynchronous system), there is an unavoidable indeterminism in when/how the scheduling message is processed on different nodes. This is an impediment to the goal of dispatching processes "simultaneously" across different nodes and emphasizes the act that there is no such notion of simultaneous in such systems. Also, if the scheduling message cannot be delivered to all the nodes of the gang at the same time, then the scheduling skew of the scheduling message is increased by the delays in message arrival at the different nodes.

Communication between gang members and/or members of other sets of members is problematic. Multicast messages can be used to communicated information among such members. However, these schemes typically are not reliable as they multicast the message without any acknowledgements from the receivers, or all members must acknowledge each and every message which is not efficient nor scalable.

SUMMARY

Disclosed are, inter alia, methods, apparatus, data structures, computer-readable medium, mechanisms, and means for initiating and performing tasks by a gang of members, such as, but not limited to gang members in routers, packet switching systems, computer systems, and other devices. As the number of embodiments and corresponding applications thereof are extensible, these members may correspond to different computers, elements, components or other devices, etc., which are connected in some fashion, such as by that including a network, system bus, switching fabric, wire, or any other communications mechanism. In one embodiment, a member of a gang identifies an event or other condition which requires notification to and/or action to be taken by at least a subset, if not all the other members of the gang. The gang member notifies other gang members by sending a message, such as that using reliable group communication using multicast and/or unicast messages. In one embodiment, if the action explicitly or implicitly identifies a priority level different than that of the receiving gang member, the priority level of the receiving gang member may be adjusted. The information notified to other gang members and/or actions to be performed are extensible to meet the needs of the wide-variety of possible applications of embodiments. A small list of example subject areas of these applications includes collecting, distributing, updating, responding to, and/or other processing of error conditions, routing information (e.g., between systems, from a route processor to line cards within a system, etc.), configuration information, flow control information, statistics or other values, etc.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
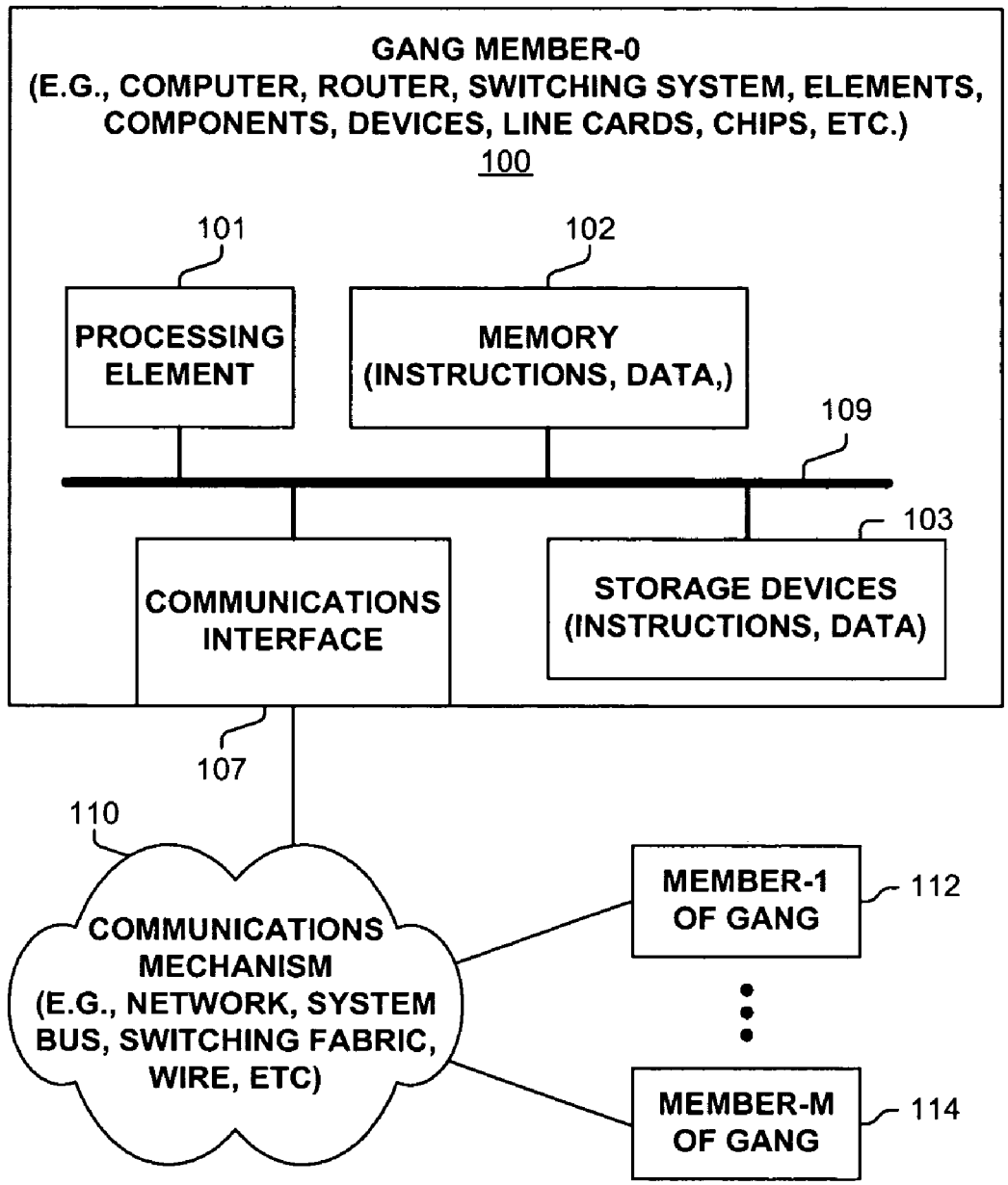
FIG. 1A is a block diagram illustrating an example of a gang of nodes used in one embodiment.

Disclosed are, inter alia, methods, apparatus, data structures, computer-readable medium, mechanisms, and means for gang scheduling among one or more components and/or systems, which may include real-time scheduling in one or more asynchronous systems, such as, but not limited to gang members in routers, packet switching systems, computer systems, and other devices. Typically, the gang scheduling mechanisms disclosed herein are most useful for scheduling among asynchronous components/systems. However, even though synchronous systems with coordinated schedulers may be able to perform synchronous scheduling among multiple components/systems, the mechanisms disclosed herein still could be used in such systems.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not, limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable medium, mechanisms, and means for performing gang scheduling of members and/or reliable group communication between said members, such as, but not limited to gang members in routers, packet switching systems, computer systems, and other devices. Note, gang scheduling can be performed using reliable group communication or other communications scheme, and reliable group communication can be used in an unlimited number of applications and/or contexts different than that using gang scheduling.

As the number of embodiments and corresponding applications thereof are extensible, these members may correspond to different computers, elements, components or other devices, etc., which are connected in some fashion, such as by that including a network, system bus, switching fabric, wire, or any other communications mechanism. In one embodiment, a member of a scheduling gang identifies an event or other condition which requires notification to and/or action to be taken by at least a subset, if not all the other members of the gang. The gang member notifies other gang members by sending a message, such as that using reliable group communication using multicast and/or unicast messages. In one embodiment, if the action explicitly or implicitly identifies a priority level different than that of the receiving gang member, the priority level of the receiving gang member may be adjusted. The information notified to other gang members and/or actions to be performed are extensible to meet the needs of the wide-variety of possible applications of embodiments. A small list of example subject areas of these applications includes collecting, distributing, updating, responding to, and/or other processing of error conditions, routing information (e.g., between systems, from a route processor to line cards within a system, etc.), configuration information, flow control information, statistics or other values, etc.

Also disclosed are, inter alia, methods, apparatus, data structures, computer-readable medium, mechanisms, and means for a reliable multicast communication scheme, which may be in routers, packet switching systems, computer systems, and other devices. As the number of embodiments and corresponding applications thereof are extensible, these nodes using this reliable multicast communication scheme may correspond to different computers, elements, components or other devices, etc., which are connected in some fashion, such as by that including a network, system bus, switching fabric, wire, or any other communications mechanism. In one embodiment, multiple nodes are sent a multicast message, which includes an indication of one or more designated nodes to acknowledge the message, a sequence number or other message identification value, and possibly an indication whether an immediate or delayed acknowledgment is requested. A node receiving the message responds accordingly if it is designated to acknowledge the message, which may include requesting any missing messages, and/or sending an acknowledgment message for the messages it has received since it sent its last acknowledgment message. Note, the term node and member are typically used interchangeably herein.

For example, FIG. 1A illustrates multiple gang of members 100 and 112-114 in a configuration used in one embodiment. Members 100 and 112-114 can be individual systems or components (e.g., computers, routers, switching systems, elements, components, devices, line cards, chips, etc.), in other words, basically anything that can send, receive, and process messages, with at least one gang member or other source having the capability to send messages. Members 100 and 112-114 are connected via a communications mechanism 110 (e.g., a network, bus, switching system, wire, etc.), and over which, dispatch messages are sent to at least a subset of members 100 and 112-114.

For example, gang members 100 and 112-114 could be within a single packet switching system, router, or other communications devices with members 112-114 located on line cards or elsewhere, with gang member 100 located on a control card, line card, or elsewhere. Thus, gang members 100 and 112-114 could perform gang scheduling among themselves or communicate information using a reliable multicast or other communications scheme, such as for, but not limited to collecting statistics, updating routing information, responding (e.g., updating routing information, re-routing or dropping packets, etc.) error/fault conditions or configuration changes.

Additionally, FIG. 1A illustrates a configuration of a scheduling gang member 100 used in one embodiment. Member 100 typically includes mechanisms and means for sending, receiving, and reacting to dispatch messages. For example, one embodiment includes a process performing an operation described herein. One embodiment includes a process corresponding to one of the block or flow diagrams illustrated herein, or corresponding to any other means or mechanism implementing all or part of a claim with other internal or external components or devices possibly implementing other elements/limitations of a claim. Additionally, a single or multiple systems, devices, components, etc. may comprise an embodiment.

In one embodiment, member 100 includes a processing element 101, memory 102, storage devices 103, and an interface 104 for receiving and transmitting packets or other items, which are coupled via one or more communications mechanisms 109 (shown as a bus for illustrative purposes).

Various embodiments of member 100 may include more or less elements. The operation of member 100 is typically controlled by processing element 101 using memory 102 and storage devices 103 to perform one or more tasks or processes, such as, but not limited to adjusting values and accordingly updating one or more residue amounts.

Memory 102 is one type of computer-readable medium, and typically comprises random access memory (RAM), read only memory (ROM), flash memory, integrated circuits, and/or other memory components. Memory 102 typically stores computer-executable instructions to be executed by processing element 101 and/or data which is manipulated by processing element 101 for implementing functionality in accordance with one embodiment of the invention. Storage devices 103 are another type of computer-readable medium, and typically comprise solid state storage media, disk drives, diskettes, networked services, tape drives, and other storage devices. Storage devices 103 typically store computer-executable instructions to be executed by processing element 101 and/or data which is manipulated by processing element 101 for implementing functionality in accordance with one embodiment of the invention.

In one of an unlimited number of applications of gang scheduling and/or reliable group communication, a packet switching system may consist of potentially large numbers of members/nodes with each running an independent instance of the operating system. Collectively the nodes form one distributed system, although the nodes may be loosely coupled. In this one system, therefore, there is no centralized operating system presence as all of the nodes are running independently and asynchronously. The fact that each node is an independent operating system instance also implies that there is no higher-level scheduling in the system (which is synonymous with the system being asynchronous). This presents a problem if there are system-wide events that require the simultaneous cooperation of processes on different nodes. Because the nodes are asynchronous, it is not possible to simultaneously schedule processes on different nodes (else the nodes could not be described as loosely coupled and asynchronous). Therefore, there needs to be a scheduling component in the system that is able to guarantee that cooperating processes are simultaneously dispatched on different nodes in a timely manner.

One embodiment provides a gang scheduling infrastructure to dispatch cooperating processes on different nodes (i.e., different gang members) in a timely manner that typically approximates or actual provides simultaneous operation. In one embodiment, all nodes (e.g., gang members) are running priority-based, preemptive schedulers. Thus, in response to a gang scheduling message, corresponding operations can be initiated/performed on each of the nodes. Moreover, if all nodes have an agreed upon set of priority levels for performing operations, in response to a gang scheduling message, each node will immediately (and thus effectively simultaneously) initiate/perform the corresponding operation (assuming no node is currently operating an equal or higher level process upon receipt of the dispatch message).

Such cooperating processes typically have the opportunity to join named scheduling gangs using a naming service, or can be assigned to a scheduling gang. Note, in one embodiment, a gang member may be in more than one gang. In one embodiment, application programming interfaces (APIs) are provided to schedule the members of a scheduling gang at a specified priority on whatever nodes they reside.

Furthermore, one embodiment provides a mechanism for the referentially uncoupled gang members to communicate with each other, for whatever reasons. That is, there is a communication stream among gang members that is not associated with the dispatching of gang members, but which has the purpose of allowing control messaging. This message stream is distinguished from the message stream that is used to schedule gang members, as this message stream is not deemed as critical and, therefore, its messages will typically not have scheduling priorities associated with them, or at least have lower priority messages. Thus, there are APIs provided by this infrastructure that will enable the non-critical control messaging within members of a scheduling gang. Messages that are used to dispatch members of a scheduling gang will typically be referred to herein as scheduling messages, and other messages between gang members will be referred to as control messages.

Scheduling gangs are global to the entire system and, therefore, in one embodiment, the namespace for gangs is maintained in a name registration system (NRS). In one embodiment, the namespace for the nodes is static and known a priori, derived from configuration information, and/or via another mechanism so a NRS is not necessarily used.

One embodiment uses group communication such that when a message is delivered to a scheduling gang, all members of that gang receive the message and are dispatched at the scheduling priority specified in the message or at another priority level (e.g., default level.) It is desirable to have all members of the gang dispatched on their respective nodes at the same time. However, in one embodiment with the nodes running independent and uncoordinated schedulers, this cannot be guaranteed. The best that can be accomplished is to deliver the notification to awaken the gang members at the same time and, for that reason, notifications (messages) to gang members typically are multicast messages, especially those generated over a common communications medium which provides a negligible delay between gang members.

Once a scheduling gang is established, each scheduling message is typically delivered to all members of the scheduling gang, as long as there are no communication failures or crashes. In one embodiment, a guaranteed delivery of each scheduling message is desired because the event that results in dispatching a scheduling gang may be a critical system event, with the gang members being the handlers on their respective nodes for the event. Because the memberships of gangs may change, the multicast addresses may change to reflect the change in the set of nodes containing members of a particular gang and/or the nodes listening to a particular multicast address may change. Group services accommodates this dynamic multicast addressing mechanism.

In one embodiment, the gang scheduling infrastructure is built on top of a set of group services. The communication between members of a scheduling gang is a special case of group communication within a special system group that encapsulates priority and scheduling semantics in order to implement gang scheduling. Within this scheduling group, all members belong to one or more gangs and all messages from members are delivered to a particular gang.

A scheduling message being sent to gang members may have a priority associated with the message. If so, the effect of delivering a scheduling message to members of a scheduling gang is that all the members receiving the message will typically be dispatched on their individual nodes at the priority specified by the message. In one embodiment, the API for this dispatching of a scheduling gang accommodates an optional priority. If no priority is supplied, a default priority, such as, but not limited to the base priority of the scheduling gang established at the time of the gang creation, is used in the message.

Note, in one embodiment, dispatch messages are sent from a node with a message having the highest priority being sent first; while in one embodiment, the messages are sent in the order they are generated or queued, etc. Similarly, in one embodiment, received gang dispatch/scheduling messages are processed in an order corresponding to their priority; while in one embodiment they are processed in the order they are received or queued, etc. There are an unlimited number of techniques and/or data structures that can be used in an embodiment for reordering messages based on priority levels, such as, but not limited to sorting and/or insertion techniques. One embodiment allocates a maximum message size amount of storage for each message, whether it is required or not, to make such reordering more efficient.

Depending on the embodiment and application thereof, some gangs may handle critical system events in as timely a manner as possible. In one embodiment, in order to meet any deadline constraints associated with an event that requires the scheduling of a scheduling gang, whenever a group services process receives a message that is to be delivered to gang members (as opposed to either control messages or messages relating to the membership of a scheduling gang), it will boost its priority if it is lower to that in the message so that it expedite the scheduling of the gang member(s) on that local node.

In one embodiment, the APIs provided for gang scheduling pertain to: the creation of a scheduling gang, locating a scheduling gang in the system to see if it has been created/joined, the membership of a scheduling gang (join or leave a scheduling gang), sending control messages to all or a subset of members of a particular gang, dispatching all the members of a scheduling gang at a specified priority. In one embodiment, a process must be a member of a scheduling gang in order to deliver a message to that gang. In one embodiment, a process does not need to be a member of a scheduling gang in order to deliver a message to that gang.

Figure 1B:
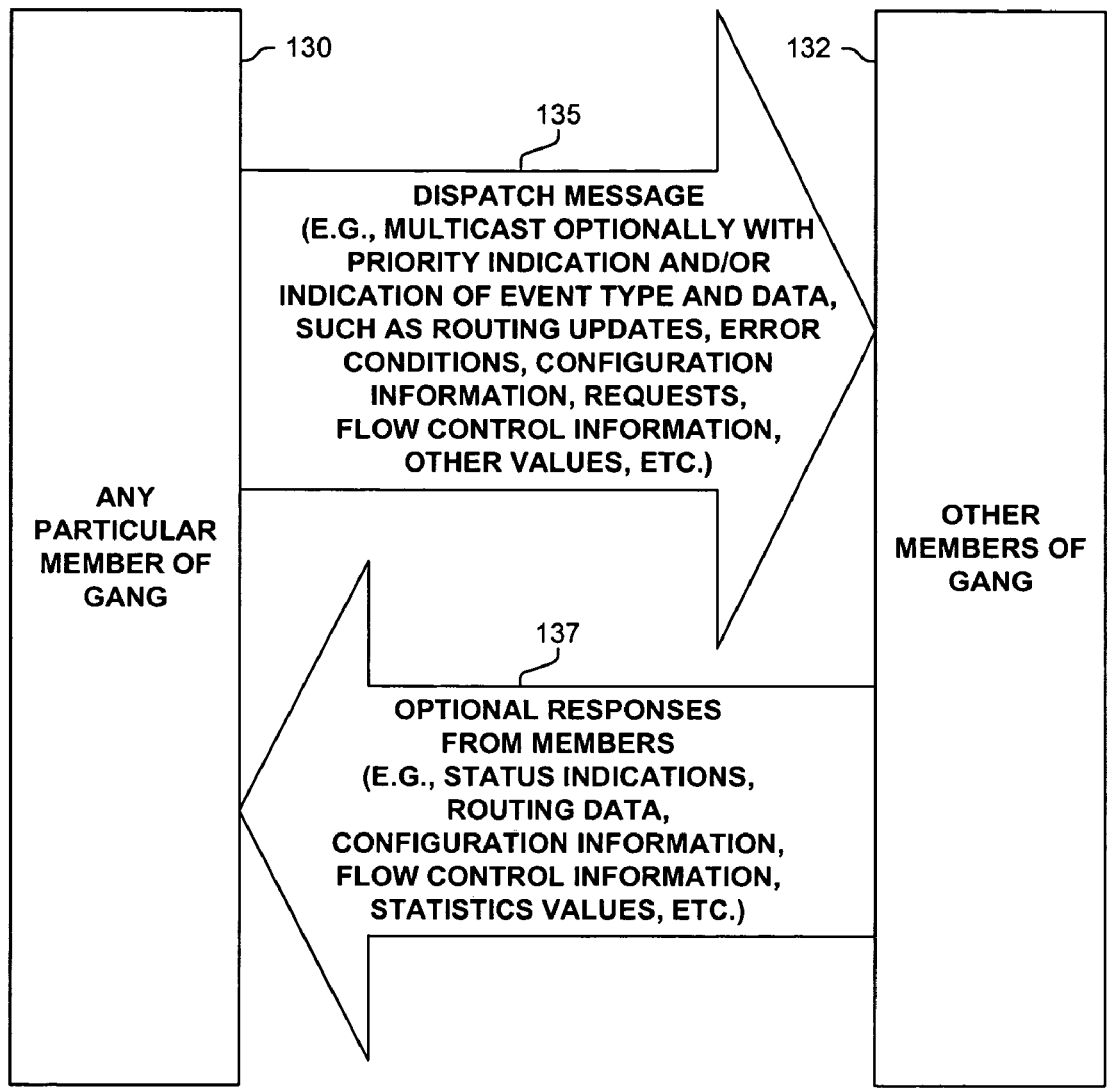
FIG. 1B is a block diagram illustrating an example of communication between nodes used in one embodiment.

FIG. 1B illustrates exemplary communication between a member 130 of a scheduling gang and other members 132 of the gang. In one embodiment, node 130 sends a dispatch message 135 to the other members 132 of the gang. In one embodiment, this dispatch message is a multicast message. In one embodiment, dispatch message 135 includes an indication from which a priority level can be directly or indirectly (e.g., via a lookup operation on a data structure) determined. In one embodiment, dispatch message 135 includes an indication of the type of event to which dispatch message 135 corresponds. Examples of the types of events and data associated with a dispatch message include, but are not limited to routing updates, error conditions, configuration information, requests, flow control information, other values etc. Examples of operations performed by gang members in response to a dispatch message by one or more embodiments includes, but are not limited to collecting one or more statistics values, updating a data structure with routing updates, changing configuration or routing information, taking corrective measures in response to an identified fault, etc. After performing some processing, each of the other nodes 132 of the gang may send a response message 137 to node 130 (or any other nodes). Examples of data included in such response messages include, but are not limited to statistics values, results, status indications (e.g., whether an operation is completed, status of the entity, etc.), routing data, configuration information, flow control information, etc.

Figure 1C:
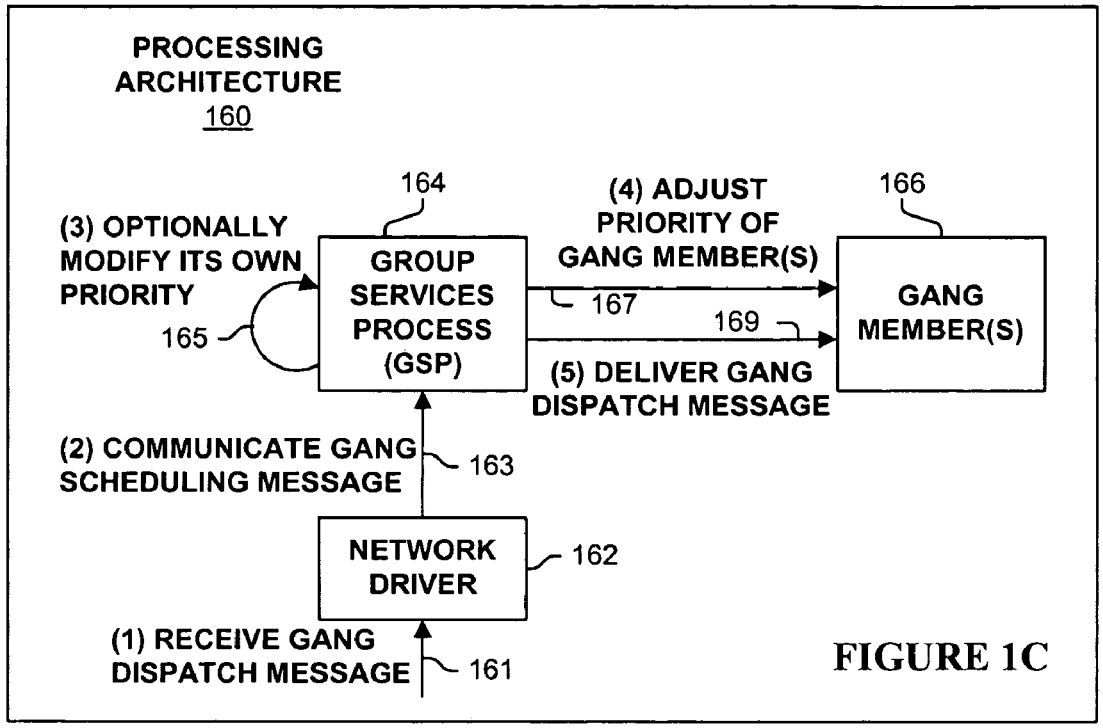
FIG. 1C is a block diagram illustrating an example processing architecture used by a node in one embodiment.

FIG. 1C illustrates an annotated processing architecture 160 used in one embodiment. As shown, network driver 162 receives the gang dispatch message 161. The gang scheduling message is communicated to group services process (GSP) 164 as indicated by reference number 163. GSP 164 typically looks at the scheduling message, and modifies (e.g., typically raises as required, but can lower) its priority level as required as indicated by reference number 165. GSP 164 then adjusts (e.g., typically raises as required, but can lower) the priority level of the one or more gang members 166 corresponding to the dispatch message as indicated by reference number 167. Finally, as indicated by reference number 169, the gang dispatch message is delivered to the one or more gang members 166, which then accordingly process the message and typically initiate and/or perform one or more operations.

Figure 1D:
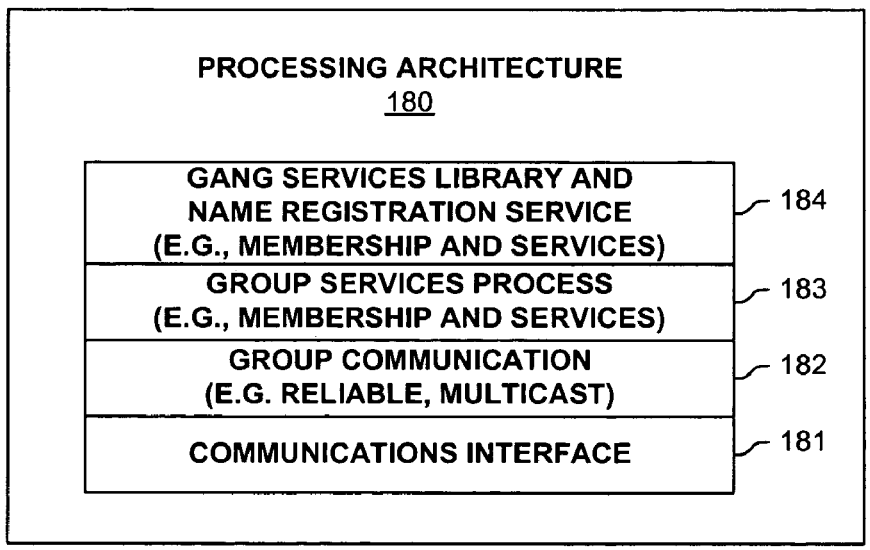
FIG. 1D is a block diagram illustrating an example processing architecture used by a node in one embodiment.

FIG. 1D illustrates a processing architecture 180 used in one embodiment. From one perspective, processing architecture 180 can be viewed as a hierarchy of layers. Starting at the bottom, communications interface 181 provides the low layer protocol processing for communicating over the communications mechanism. Group communication 182 provides the communication among group members using the services provided by communications interface 181. In one embodiment, group communication 182 provides reliable communication between members; while in one embodiment it does not. Next, group services process 183 provides basic group services, such as group membership (e.g., the NRS) and other services, with gang services library and name registration services 184 providing capabilities to the gang, which can be viewed as a special type of group, typically with certain processing and communications requirements for fast and reliable gang scheduling.

In one embodiment, the gang scheduling services are implemented through three components: the name registration system (NRS), a gang services library, and a group services process, with the function of each further described hereinafter. Of course, other embodiments are possible. This is just an example of one of an extensible number of implementations.

Gangs are registered and located by name in NRS. The NRS handle assigned by NRS is used in all gang scheduling APIs except the API to create a scheduling gang. When the caller initializes the gang scheduling services the NRS class for gang scheduling is created. And when a scheduling gang is created its name is entered in the NRS database for global reference.

The APIs that invoke the services are implemented in a gang services library, which invokes the services of the group services library, as at least in one embodiment, the gang scheduling is implemented over the provided group services. Therefore, applications which use the gang scheduling APIs will pull in these two libraries. When the caller initializes the gang scheduling services it is joined to the system group for gang scheduling and is set up for group communication within this group.

The third component used in this example embodiment is in the group services process (GSP), which implements the infrastructure for groups and group communication. The GSP infrastructure implements special scheduling semantics for the members of a special system group for gang scheduling. The gang scheduling group views its members as always belonging to one or more gangs, and each GSP in the group (i.e., hosting members on its node that belong to the scheduling group) keeps track of (1) all gangs in the system and (2) all of the gangs to which each of its members belong.

The following discussion represent discrete actions and paths of execution in the gang scheduling infrastructure used in one embodiment, such as this working example. When a process wishes to participate in gang scheduling, it is typically first initialized by a call to initialization process, which creates an NRS name class, and then joins the caller to the system scheduling group, which prepares the process for group communication. This also creates a global handle which can be used in subsequent APIs for referencing that gang.

Internally, once the NRS handle is obtained for the new scheduling gang, the GSPs comprising the scheduling group are notified about the new gang and they store state about the new gang in the group: its NRS handle, its scheduling priority, and the node of the GSP creating/joining the gang. The node identity is used to maintain an up-to-date dynamic multicast address for the gang.

If a process desires to see if a scheduling gang exists before trying to join it, or if one only knows the name of a scheduling gang and wishes to obtain its handle, it can make a query to the NRS for the NRS handle for the gang. If the gang name has been registered in NRS, then the local GSP is queried to see if the gang has been created. If it has, the NRS handle, the GSP's notion of how many nodes are in the gang (updates may be pending, but the GSP will make no attempt to make sure that the node count will not change), as well as the base priority that the gang was created at will be returned to the caller. A second query is also possible to the local GSP to see if the gang has been created. If it has, the NRS handle, the GSP's notion of how many nodes are in the gang (updates may be pending, but the GSP will make no attempt to make sure that the node count will not change), as well as the base priority that the gang was created at will be returned to the caller.

In order to join a scheduling gang, an application will typically have obtained the name or other identification of the gang, as typically all cooperating processes that become members of the same gang must have some way of knowing/agreeing upon the name or other identification of the scheduling gang they will become. Once this is known, a scheduling gang can be joined through one of two methods. First, a call to create a scheduling gang using the gang's name. Note that if the gang has already been created, then the caller is joined to the gang and the multicast address of the gang will be updated to include the caller's node id. Second, a call to join the gang which requires the NRS handle, which will join the caller to the gang and result in the multicast address of the gang being updated to include the caller's node id. The local GSP will multicast a message to the group indicating that its node needs to be added to the address for the gang in question. The NRS handle can be obtained by using an NRS API to search or register a scheduling gang.

Scheduling messages are delivered to a scheduling gang via a gang deliver API. In this API, the caller can provide an optional priority, in case the caller wishes to change the priority that the gang members would be dispatched at. That is, gangs typically have a base priority associated with them, which is the priority which is established at the time of their creation. This allows a scheduling gang to have several priorities associated with it (such as those corresponding to different events of varying priority), and each message to the gang can have a different priority. Also, one embodiment provides adaptive scheduling policies to be applied to deadlines for the gangs, and thus, gang members may be dispatched at varying priorities for a same type of event. Once again, the implementation varies to accommodate the needs and application of an embodiment.

Figure 2A:
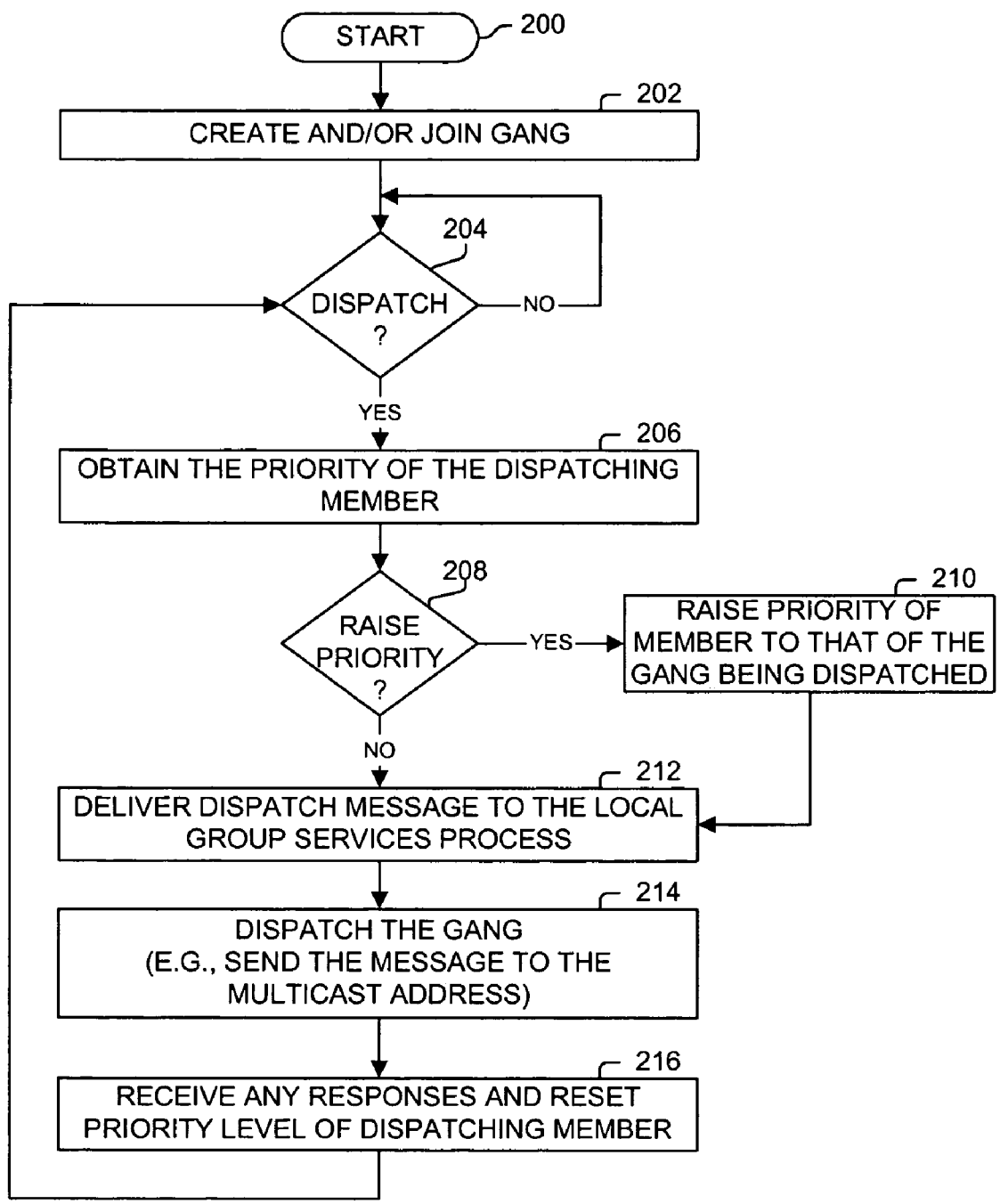
FIG. 2A is a flow diagram illustrating a process used in one embodiment for dispatching gang scheduling messages.
Figure 2B:
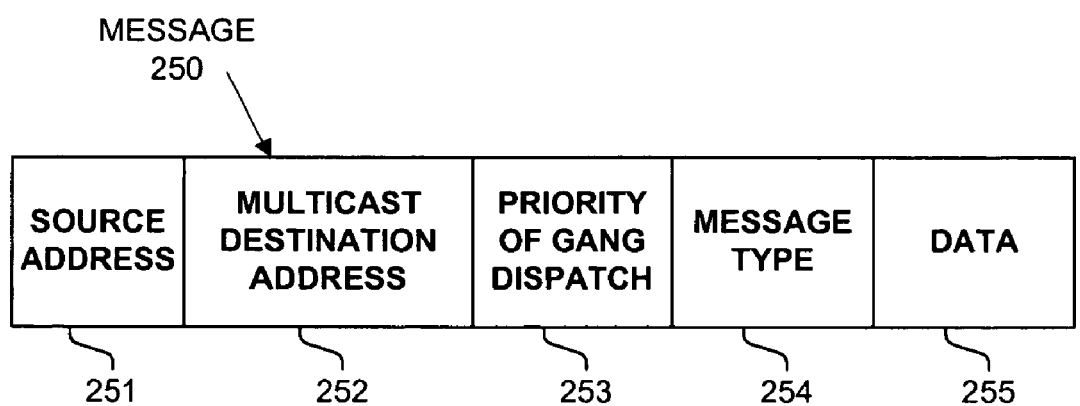
FIG. 2B is a block diagram of a gang dispatch message used in one embodiment.
Figure 3:
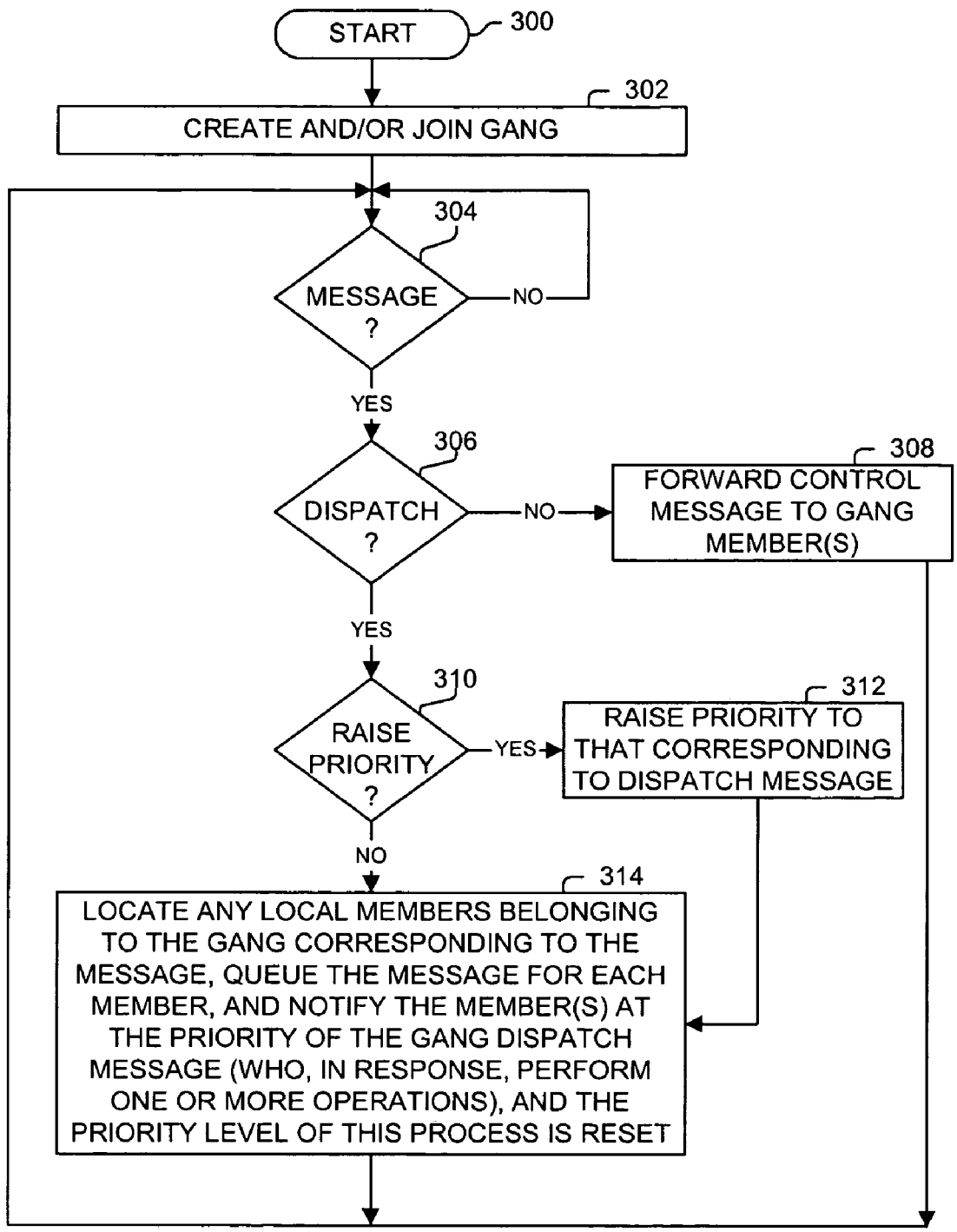
FIG. 3 is a flow diagram illustrating a process used in one embodiment for reacting to a dispatch message.

FIGS. 2A-B and 3 illustrate processes used and gang scheduling dispatch messages used in one embodiment. Of course, the same message format and processes can be used to dispatch the same or different gangs to respond to different types of events which may be performed at different levels of priority (e.g., that commiserate with the type of event). For example, these processes and messages might be used to dispatch a gang at a highest level to respond to a fault or other urgent condition, as well as dispatching the same or a different gang to return statistics or configuration information at a different priority level.

FIG. 2A is a flow diagram illustrating a process used in one embodiment for dispatching gang scheduling messages. Processing begins with process block 200, and proceeds to process block 202, wherein the scheduling gang is created or joined by the member. As determined in process block 204, if there is a gang scheduling message to dispatch, such as, but not limited to the identification of an event (e.g., the expiration of a timer, the receipt of data, the identification of a fault or other condition, a request from another process, etc.), the processing proceeds to process block 206, wherein the priority level of the dispatching member is obtained. As determined in process block 208, if the priority of the gang scheduling event is higher than the current priority of the dispatching member, then its priority level is raised in process block 210 so the dispatching of the gang scheduling message will be performed at least at the priority level of the event. Then, in process block 212, the dispatch message is delivered to the local group services process. In process block 214, the gang is dispatched, such as by sending a dispatch message to the other gang members (e.g., by sending a multicast or multiple unicast messages). Finally, in process block 216, any responses are received and as needed, the priority level of the dispatching member is return to its original level. Processing returns to process block 204 to perform gang scheduling when appropriate.

FIG. 2B is a block diagram of a gang scheduling dispatch message 250 used in one embodiment. As shown, gang scheduling dispatch message 250 includes a source address 251, multicast destination address 252, priority level of the gang dispatch 253, a message type 254 (e.g., dispatch or control), and data 255. Of course, some embodiments use more or less fields.

FIG. 3 is a flow diagram illustrating a process used in one embodiment for reacting to a dispatch message. Processing begins with process block 300, and proceeds to process block 302, wherein the process creates and/or joins a gang. Next, as determined in process block 304, if a gang message is received, then processing proceeds to process block 306. As determined therein, if it is not a gang scheduling dispatch message, then in process block 308, the control (e.g., not a gang scheduling dispatch message) is forwarded to the one or more gang members supported by this process. Otherwise, as determined in process block 310, if the priority level of this process is below that of the dispatch message, then in process block 312, the priority level of this process is raised to that corresponding to the dispatch message, with this priority level typically being explicitly or implicitly defined. In process block 314 and running at least at the priority level of the dispatch message, any local gang members belonging to the gang corresponding to the gang dispatch message being processed are located and forwarded a copy of the gang scheduling dispatch message (e.g., via a queue, interprocess communication, or using any other communications scheme), and each gang member is notified of the event (this could be implicit with the delivery of the message). The scheduling gang member(s) then perform an operation corresponding to the gang dispatch message, including possibly returning results as required to the dispatcher or other entity. The priority level of this process is also reset as required. Processing then returns to process block 304.

In one embodiment, the caller of the API to dispatch a scheduling gang must be a member of the gang to which the message is being sent; while, in one embodiment, this is not a requirement. Once the membership is confirmed, the following are the steps executed in the delivery of the message to the gang. First, the current priority of the caller is obtained via a system call. If the caller's current priority is not as high as the priority of the priority passed in (or of the base priority of the gang if none is passed in), the caller's priority is raised to this level via a system call. Next, the message is delivered to the local GSP. Because the caller's priority was raised prior to the priority level of the message, priority inheritance will guarantee that the local GSP will receive the message at the priority of the gang message. Next, the local GSP will look up the gang by its handle and multicast the message to the multicast address associated with the gang. The GSPs which receive the message will first check to see if the incoming message is a message delivered to gang members (as opposed to a message pertaining to membership changes within a scheduling gang). If it is, then it will change its priority if its priority is lower than that of the priority of the gang message. Having boosted its priority, each receiving GSP will locate any local members belonging to the gang in question. It will queue the message for input for the member and then notify member at the priority of the gang message.

In one embodiment, members of a scheduling gang may send non-scheduling messages (e.g., control messages) to subsets of other members within the same gang, just as if the gang formed its own private group.

Also, if for some reason a process wants to withdraw from a scheduling gang, it can do so using an API call. Once the caller is verified as a member of the gang, it is removed from the gang by the local GSP. If the caller is the only member of the gang on its node, the multicast address for that gang will need to be trimmed to remove the local node from the address. A message will be sent to the group to update the address for this gang.

In one embodiment, members of a scheduling gang of networked nodes use a predetermined multicast address to communicate with other nodes of the gang using reliable multicast messages. In this manner, any node can readily send information to other gang members simply by using the multicast address, and gang members can easily join or be removed from a particular gang. Thus, requirements for distributing state among the gang members can be met by simply sending messages to the group address for the gang. Examples of the state that can or need to be communicated include: overhead, distributed termination, state distribution, process-stuck-detection, the network context (single or multiple) overhead, etc. Also, using multicast messages avoids overhead and delay typically induced by other communication techniques. There is no need for channels, or connections between the processes or a scheduling coordinator.

One embodiment uses reliable group communication between a sending node and one or more other nodes to communicate information and/or to dispatch gang scheduling messages. In one embodiment, group communication is implemented over a multicast framework with a transport layer guaranteeing reliable delivery of multicast messages. In other words, reliable group communication and gang scheduling can be used together or separately. Note, typically, any node can be a sender at one time and a receiver at another time.

In one embodiment, each node in the distributed system consists of applications which interface to a group messaging layer, which maintains the concept of a group and has a presence on every node of the system. It is responsible for the in-order delivery of messages to its local members of a group, as well as delivering messages from its members to other members on the same or remote nodes in the group. The group messaging layer logically interfaces to a transport layer which actually implements the reliable delivery of group messages and manages the acknowledgment of the reception of a message at a node, the retransmission of a message, flow control, etc.

In one embodiment, the sender of a message knows the identity of all the receivers in the group, or at least those in which reliable communication is desired. Typically, a monotonically increasing sequence number space is used to identify the sequence of messages with the sequence numbers wrapping around after reaching a maximum value; although, any message sequence identification mechanism can be used.

In one embodiment using reliable group communication, each message is acknowledged by each receiver. Thus, for each multicast message sent to n receivers, there are n acknowledgement messages sent. In certain applications this works well. However, in certain applications, it would be beneficial if the number of acknowledgement messages could be reduced, while still providing reliable and efficient communication among the group members.

In one embodiment, receiving nodes acknowledge the highest consecutive sequence number message they have received, but have not already acknowledged or acknowledge every nth message, wherein n is an integer. Thus, the number of acknowledgement messages sent is typically less than, and often significantly less than the number of messages being acknowledged. For example, if a receiver received messages with sequence numbers one, two, three, and six, the receiver only sends an acknowledgment message indicating sequence number three, as this message acknowledges messages with sequence numbers one, two, and three. Only after receipt of messages with sequence numbers four and five does the receiver acknowledge message six (corresponding to sequence numbers four, five, and six). Of course, an individual acknowledgement message could be sent for sequence number four, and then the acknowledgement with sequence number six would correspond to sequence numbers five and six. In one embodiment, another identification mechanism is used to identify the receipt of consecutive and/or non-consecutive sequenced numbered messages, such as using a list and/or bitmap. This is another technique to reduce the number of acknowledgement messages required for reliable communication.

Based on the acknowledgement messages from each of the receiving nodes, at any point in time, the sender of a message knows which messages have been received by each receiving node, and that all receiving nodes have received all messages smaller than a particular earliest (e.g., smallest) sequence number acknowledged. The sender, by buffering the messages later than this particular earliest sequence number, then the sender is able to resend any of these messages to the corresponding receiver(s), and thus, recover any receivers who have fallen behind.

One embodiment reduces the number of acknowledgment messages in an another way, which may or may not be used in conjunction with another reduction scheme. In this scheme, for every message sent by the sender, the sender appoints one or more designated nodes to acknowledge the message, and a node will only acknowledge the message if it is a designated acknowledgment node. The remaining nodes process the message, but do not acknowledge back. A designated node acknowledges this message, and indicates any missing messages which the sender resends to it. For example, in one embodiment, the acknowledging node sends a list, bitmap, or other indication corresponding to the received or missing messages since sending its last acknowledgment message. In one embodiment, a designated acknowledgment receiving node acknowledges the highest consecutive sequence number message that it has received, but has not already acknowledged. If it is missing one or more messages, it sends a request to the sending node in the acknowledgement message or in another message requesting the missing message(s).

Using this scheme, every node need not acknowledge every message. So for N receivers, and assuming that for each message sent, K nodes are chosen as the designated Nodes to acknowledge the number of acknowledges are cut down by a factor of N/K, compared to the case where every message is acknowledged by every receiving node. More specifically, if on every send only one node is chosen as the designated node to acknowledge, the number of acknowledges are reduced by a factor of N.

For example, in one embodiment, one node is selected as the designated node to acknowledge in a round robin fashion. Of course, other embodiments may choose to determine the designated node using any deterministic or non-deterministic (e.g., random) manner. In this example, assume the sender is identified as node zero and there exist four receivers in the group identified as receivers one through four. When the sender sends a first message, it appoints node one as the designated node to acknowledge, for the second message node two, for the third message node three, for the fourth message node four, and finally for the fifth message node one, and so on. So, in this example, no node can fall behind more than four messages. For example, assume receiver one acknowledges message one and then does not receive messages two, three, and four. Because receiver one is not the designated node to acknowledge for messages two through four, the sender is not expecting acknowledges for these messages from receiver one, and hence is unaware of that receiver one is missing them. However, eventually when receiver one is appointed designated node to acknowledge for message five, the sender makes sure that receiver one receives messages two, three and four, because receiver one will not acknowledge message five until all the messages before and including message five have been received. Therefore, in this example, a node can fall behind by at most by M messages, when there are M receiving nodes in the group. Also, the sender is not required to maintain per receiver state; rather, only minimal state identifying the current designated node to acknowledge has to be maintained so that the designated node to acknowledge can be moved from one receiver to the next in a round robin or other fashion.

In one embodiment, the designated node acknowledges every message received from the sender (e.g., there is a window size of one). In one embodiment using a window size of one, the sender waits to receive an acknowledgement from the designated node before it identifies a new node designated to acknowledge, typically using a round robin or other deterministic or non-deterministic ordering. In one embodiment, the window size used is greater than one, which may allow greater throughput. In one embodiment with a window size greater than one, the sender keeps sending messages until the window is full, and as soon as an acknowledgement is received for a message in this window, the designated node to acknowledge can be moved to next receiver. By choosing a appropriate window size, throughput can typically be increased by the sender keeping the pipe between the senders and receivers full.

For example, assume there are four receiving nodes, receivers one to four, with receiver one designated to acknowledge messages with sequence numbers one through ten, receiver two designated to acknowledge messages with sequence numbers eleven through twenty, receiver three designated to acknowledge messages with sequence numbers twenty-one through thirty, and receiver four designated to acknowledge messages with sequence numbers thirty-one through forty. As soon as the sender receives an acknowledgement for a message from the window allocated to receiver one, the sender can move the designated node to acknowledge to receiver two. This could however lead to a receiving node falling behind other nodes by N*W messages, for N receivers and a window size of W. For example, in this case, if node one received message with sequencer number one and acknowledged the message, but missed all other messages from two to forty, recovery could be delayed till receiver one becomes the designated node to acknowledge for messages with sequence numbers forty-one to fifty because the sender might be unaware of the missed messages (this is because based on the protocol the sender does not have to wait for acknowledges for messages two through ten for which node one is the designated node to acknowledge or messages eleven to forty for which node one is not the designated node to acknowledge). So with four receivers and window size of ten, a receiver can fall behind forty messages at most with respect to other receivers in the group. The sender hence needs to buffer a large number of messages in order to ensure all the receivers will eventually receive all the messages the sender sent. Hence, the tradeoff between higher throughput and lower buffer space requirement.

In one embodiment, a side effect of sending a window of messages is that one or more of the receivers might run out of buffer space and might not be able to handle all the messages they receive and are forced to drop some of them. However, the receiving node will not acknowledge messages not processed by it. This has the effect of slowing down the sender, which is what is desired till the slow receiver catches up with the sender. The sender, when it appoints the slow receiver as the designated node to acknowledge, will be forced to wait and make sure this node receives all the messages since the last time it was the designated node to acknowledge. For example, if receiving node one in the above case were the slow node when it becomes the designated node to acknowledge for messages forty-one to fifty, the sender makes sure that message forty and lower and a message between forty-one and fifty have been successfully received by it before moving the designated node to acknowledge to the next node.

Various embodiments may choose the window size differently, such as that based on the available buffer size, the number of messages that could be sent in round trip time, etc. The window size is determined chiefly by the number of messages the sender can buffer.

For example, assume a sender can buffer B messages and the number of receiving nodes are N. Because a node can fall behind at most N*W messages for a window size of W, the sender needs to buffer N*W messages, and thus the buffer space requirement is B greater than or equal to N*W or W is less than or equal to B/N. So, in one embodiment, B/N is maximum window size possible without losing the ability to recover nodes with lost messages. If the sender does not posses enough buffer space, either a smaller window could be used, or more number of designated nodes to acknowledge can be used per message. One embodiment designates a single node to acknowledge a message. One embodiment designates multiple nodes to acknowledge a message.

For example, one embodiment designates A nodes of a total of N nodes to acknowledge each message, so there are N/A sets of nodes. All nodes from a particular set are designated to acknowledge one or more messages before designating a next particular set of nodes to acknowledge one or more messages.

Applying the same logic for a single receiving node to a set of nodes, a set of nodes can fall behind other sets of nodes by at most (N/A)*W messages (because there are N/A sets). For example, with four receivers, receivers one through four, assume the sender designates nodes one and two to acknowledge for the first window of messages, messages one to ten, and nodes three and four to acknowledge for the second window of messages, messages eleven to twenty. In this example with two sets of nodes, a node can fall behind other nodes by only twenty messages, which can be compared with the case of a single set of nodes with each message acknowledged by only one designated receiver node, by forty messages. However, this scheme could lead to more acknowledges, because all nodes in the set need to acknowledge before moving the window to the next receiver. Again for a buffer size available of B messages, in this case maximum window size possible is (W*N/A) is less than or equal to B or W is greater than or equal to B*A/N.

In one embodiment, receiving nodes use immediate and delayed acknowledgements of windows of messages, wherein an acknowledgement messages indicates the highest consecutive sequence number message they have received, but have not already acknowledged. When using the window owner concept, the designated node to acknowledge need not acknowledge all the messages in the window, and the designated node to acknowledge could be moved as soon as an acknowledgments for one of the message in the window has been received (and thus it may be advantageous to receive an acknowledgment message sooner, rather than later).

Note, this technique of using immediate and delayed acknowledgements of messages sent to one or more nodes can be used with multicast as well as with unicast messages. For example, a sender might send windows of messages to a receive using unicast messages, and request some messages be immediately acknowledged and request the acknowledgement of some messages be delayed. In one embodiment sending unicast messages with indications of whether or not to delay acknowledgment of a message, the overall number of acknowledgment messages received by the sender is reduced.

In one embodiment, a sender can request for certain messages an immediate acknowledgment be sent or a delayed acknowledgement be sent. For example, when using an acknowledgement scheme with an acknowledgement messages indicates the highest consecutive sequence number message a node has received, delaying the acknowledgment gives additional time for more messages to be received and thus a particular acknowledgment message might become obsolete and replaced by another acknowledgment message covering a wider span of sequence numbers, and typically causing less overall acknowledgment messages to be sent. As previously mentioned, when using a windowing scheme, it may be advantageous to get an acknowledgement message sooner, rather than later. Thus, an embodiment uses a combination of delayed and immediate acknowledgment messages.

In one embodiment, a sender asks for an immediate acknowledgment only for the first message in the window (and delayed acknowledgements for the other message) so that then when the acknowledge is received the sender can move the node to acknowledge. For example, if the window size is ten and sequence numbers are one through ten, the sender asks immediate acknowledgment for message one (e.g., by indicating an immediate acknowledgment is requested in the message header or via another mechanism). For the remaining messages, the sender can indicate that acknowledgment is not needed immediately (e.g., by indicating a delayed acknowledgment is requested in the message header or via another mechanism). The receiver then can queue up an acknowledgment for messages from two through ten. In response to an internal timer expiring or another event, the receiver sends an acknowledgment message acknowledging all the other received messages, or when the receiver becomes the designated node to acknowledge the next round, these messages are implicitly acknowledged with the immediate acknowledgment message of a message from the next window of messages.

For example, in one embodiment using the above scheme, the sender does not need to wait for the acknowledgment for sequencers numbers two through ten to come through before moving the window. As soon as it gets the acknowledge for message one, the sender notes that it can move the window and sends any remaining messages in the window, and then moves the node to acknowledge to the next receiver. By the time receiver one becomes the designated node to acknowledge again, either the cumulative acknowledgement for messages two through ten might has been received or when the sender sends the first message for a new window of messages again asking for immediate acknowledge, the acknowledgment of messages two through ten would be included.

For example, assuming there are four receivers, the next time receiver one would be the designated node to acknowledge, the sender will ask for acknowledges for messages forty-one through fifty. The sender asks for immediate acknowledge for message forty-one, which if acknowledged indicates the receiver received all the intermediate messages.

Figure 4A:
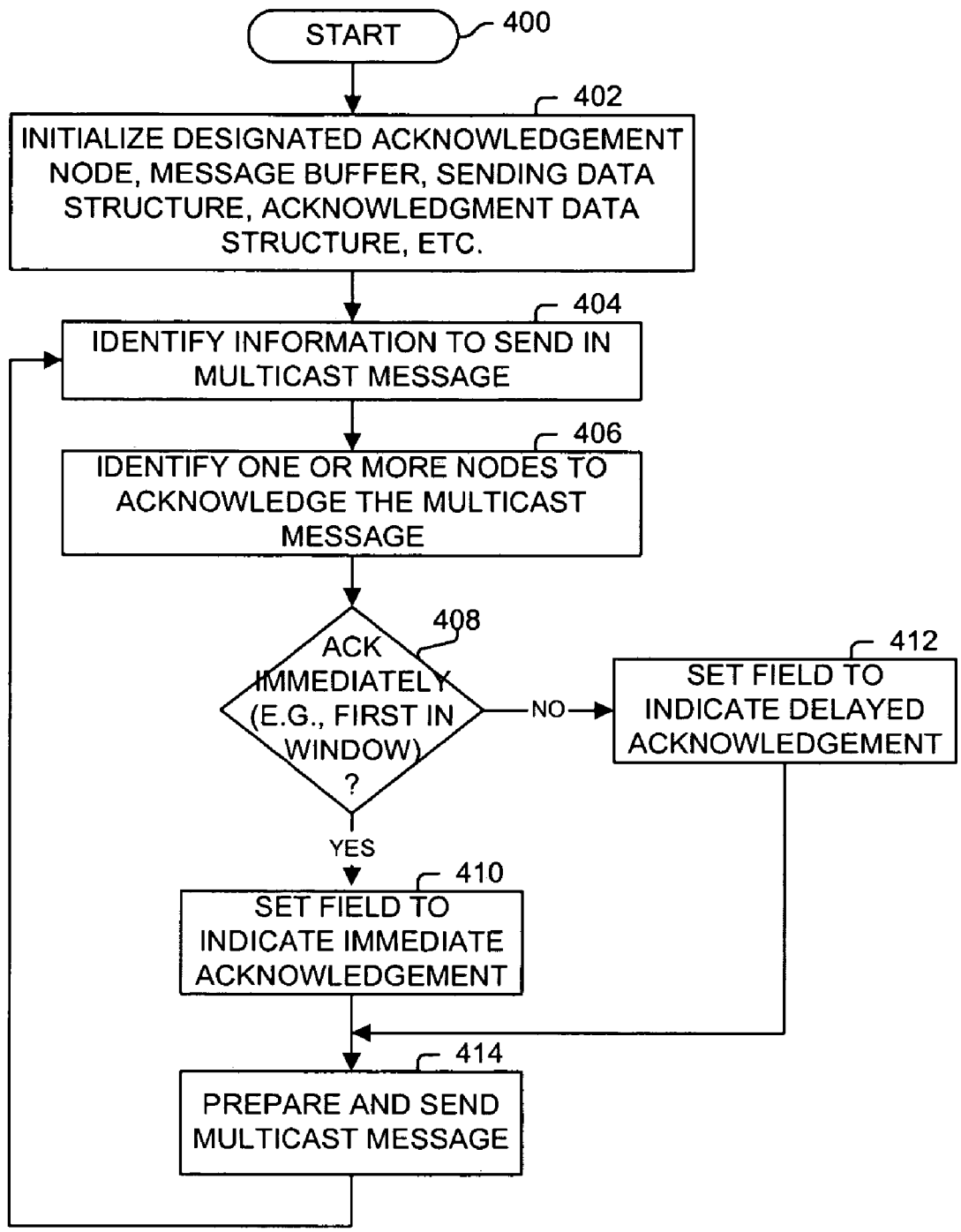
FIG. 4A is a flow diagram illustrating a process used in one embodiment for sending multicast messages.

Another example of the sending and acknowledgment of multicast messages is illustrated in FIGS. 4A-B, 5, and 6A-C. FIG. 4A is a flow diagram illustrating a process used in one embodiment for sending multicast messages. Processing begins with process block 400, and proceeds to process block 402, wherein the process is initialized, which may include such things as identifying an initial designated acknowledgement node, and initializing data structures, buffers, variables, etc. In process block 404, the information to send in a multicast message is identified. For example, this information may correspond to a gang scheduling dispatch message, a set of data (e.g., routes, configuration information, flow control information, errors, etc.) to distribute. In process block 406, one or more designated acknowledgement nodes are identified, which may include selecting one or more different nodes than the acknowledging node(s) for the last message. As determined in process block 408, if the acknowledgment is to be immediate, then in process block 410, a field is set to indicate the immediate acknowledgment; otherwise, in process block 412, this field is set to indicate a delayed acknowledgment. Then, in process block 414, the multicast message is prepared (e.g., filling in any remaining values such as sequence numbers, addresses, data, etc.) and sent. Note, in one embodiment, the multicast message uses a multicast protocol (e.g., multicast address to reach multiple nodes), while in one embodiment, the multicast message corresponds to a series of unicast messages. Processing then returns to process block 404 to process and send more messages.

Figure 6A:
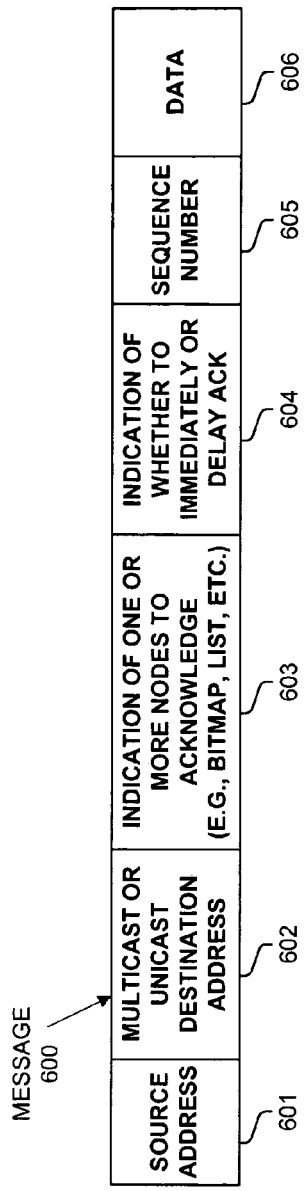
FIGS. 6A-C are block diagrams illustrating various messages used in one embodiment.

FIG. 6A illustrates one such multicast or unicast message 600. As shown, message 600 includes a source address 601 (e.g., identifying the sender of message 600), a multicast or unicast destination address 602, an indication 603 of one or more nodes to acknowledge (e.g., a bitmap with each bit corresponding to a different node and identifying whether or not to acknowledge, a list, or other indication), an indication 604 of whether or not the acknowledgment should be immediate or not (e.g., a flag or other value), a sequence number 605, and typically data 606, and possibly other fields.

Figure 4B:
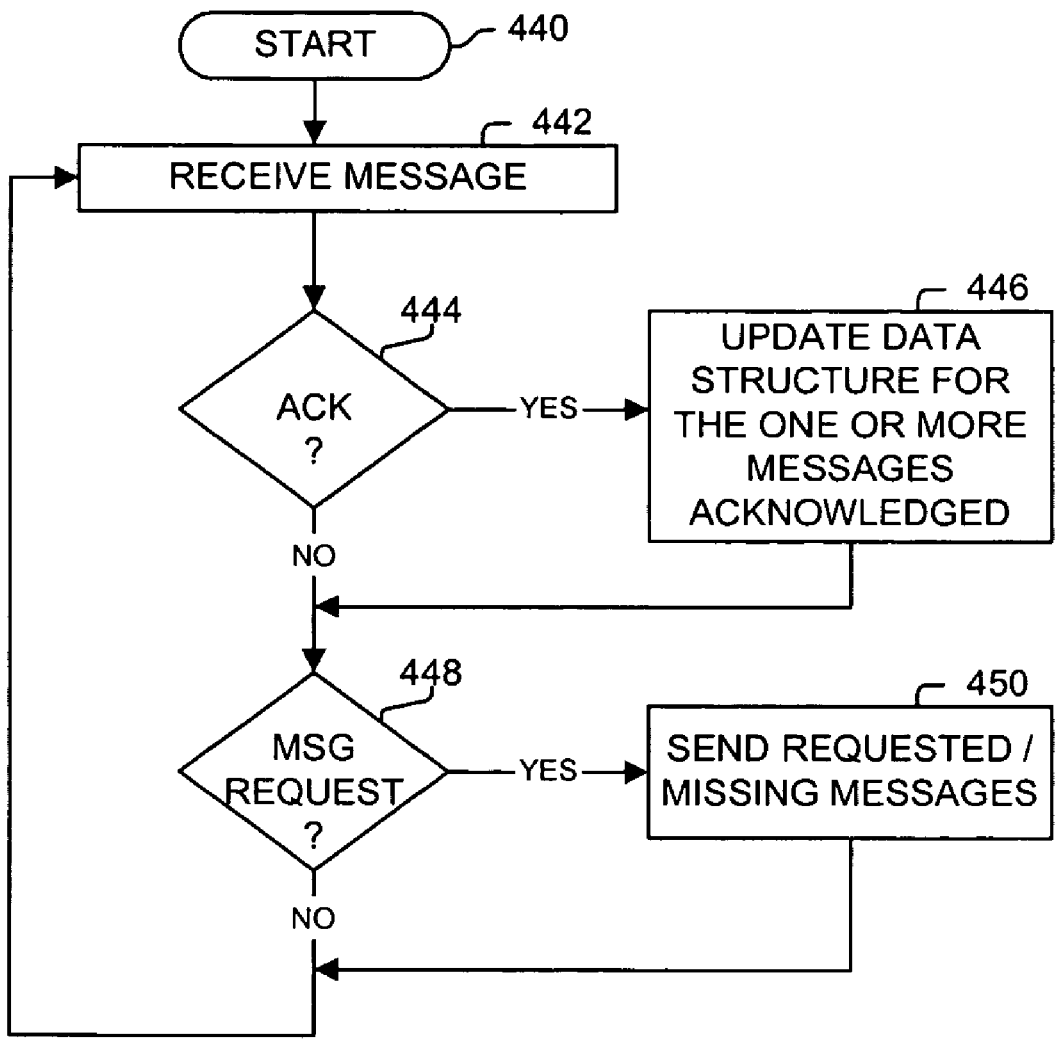
FIG. 4B is a flow diagram illustrating a process used in one embodiment for receiving and processing acknowledgment messages.

FIG. 4B is a flow diagram illustrating a process used in one embodiment for receiving and processing acknowledgment messages. Processing begins with process block 440, and proceeds to process block 442, wherein an acknowledgment message is received. As determined in process block 444, if the received message includes an acknowledgment, then in process block 446, one or more data structures are updated to indicated the one or more acknowledged messages and possibly other processing is performed. As determined in process block 448, if the message includes a request for any missing messages, then in process block 450, the missing/requested messages are sent. Processing then returns to process block 442.

Figure 6B:
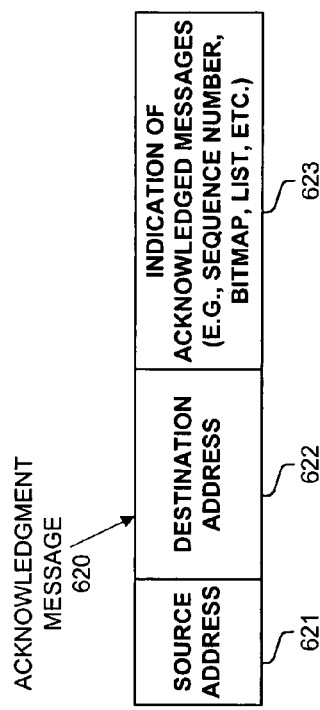

FIG. 6B illustrates one such acknowledgment message 620 used in one embodiment. As shown, acknowledgment message 620 includes a source address 621, a destination address 622, and an indication 623 of the messages being acknowledged (e.g., a sequence number, a list, a bitmap, one or more values, etc.).

Figure 6C:
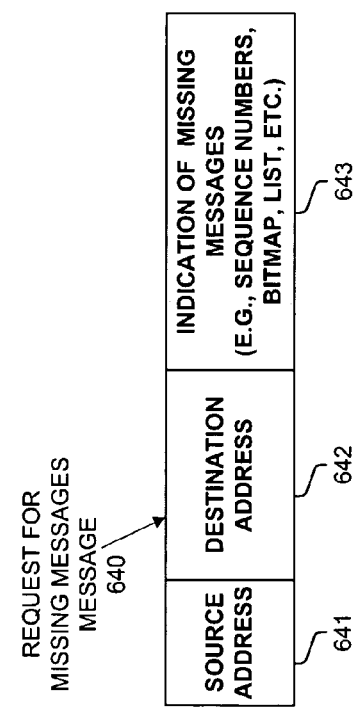

FIG. 6C illustrates one such request for missing messages message 640 used in one embodiment. As shown, request for missing messages message 640 includes a source address 641, a destination address 642, and an indication 643 of the missing or requested messages (e.g., one or more sequence numbers, a list, a bitmap, one or more values, etc.).

Figure 5:
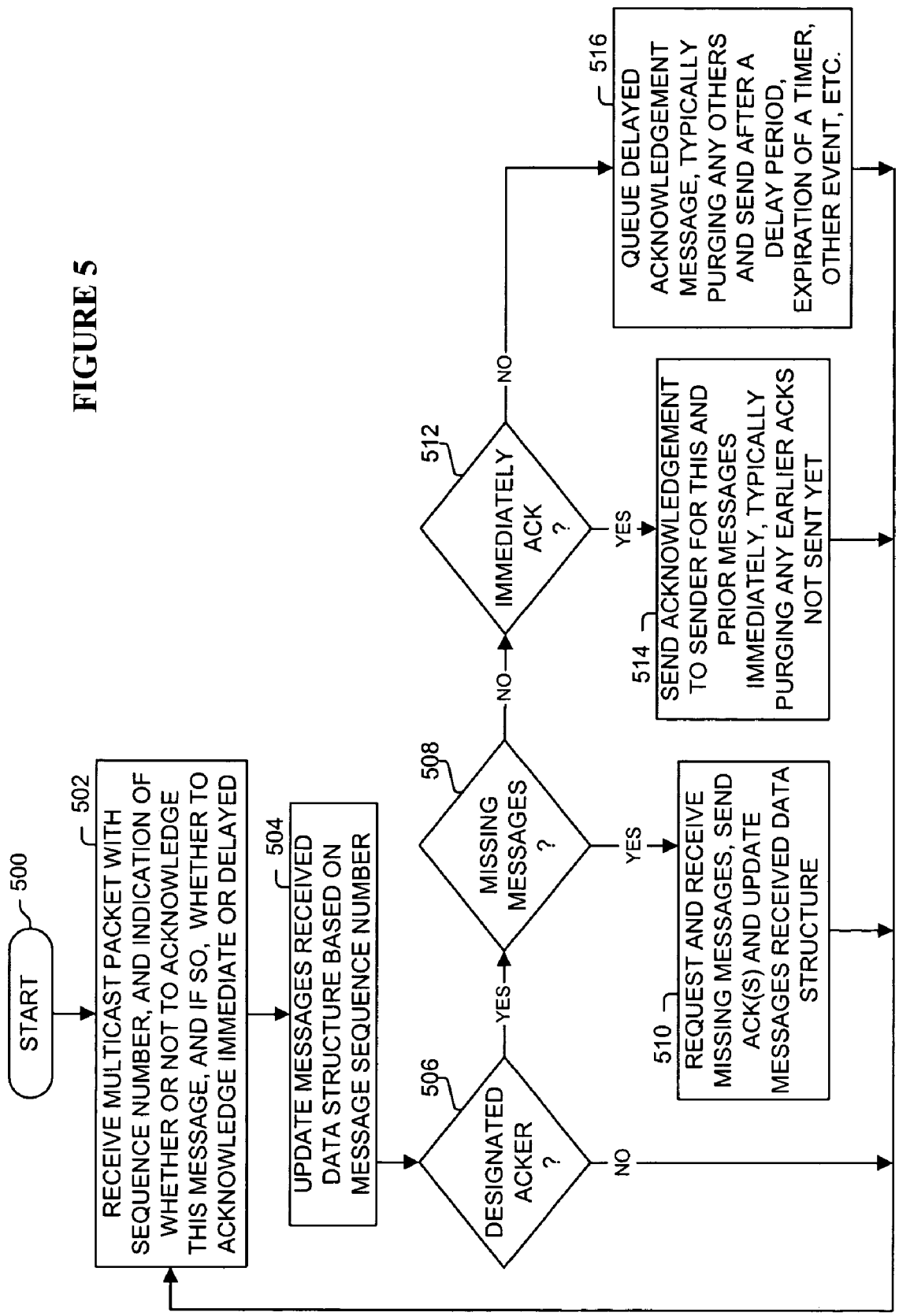
FIG. 5 is a flow diagram illustrating a process used in one embodiment for receiving and processing multicast messages and sending acknowledgment messages.

FIG. 5 is a flow diagram illustrating a process used in one embodiment for receiving and processing multicast messages and sending acknowledgment messages. Processing begins with process block 500, and proceeds to process block 502, wherein a multicast packet is received, typically with a sequence number, an indication of whether or not this receiving node should acknowledge the message, and if so, whether the acknowledgement should be immediate or delayed, and possibly other fields. In process block 504, a messages received data structure is updated based on the sequence number of the received message.

As determined in process block 506, if the node is not designated to acknowledge the message, then processing returns to process block 502.

Otherwise, as determined in process block 508, if there are missing messages (e.g., a gap in the sequence numbers indicated as received in a data structure or identified via another mechanism), then in process block 510, these missing messages are requested, received, acknowledged, with the appropriate data structures updated, and processing returns to process block 502.

Otherwise, as determined in process block 512, if the node is not to immediately acknowledge the message, then in process block 516, the delayed acknowledgment is queued or otherwise stored for future processing with any other acknowledgments with consecutive sequence numbers purged as the acknowledgment message corresponding to this acknowledgement will serve to acknowledge these purged ones. This acknowledgment is set to be sent at a future time (e.g. in response to an expiration of a timer, after a delay period, in response to some other event, etc.) if not purged before then, and processing returns to process block 502.

Otherwise, in process block 514, an immediate acknowledgement message is sent for this message and any prior messages, with their acknowledgements purged from the delay acknowledgment mechanism, and processing returns to process block 502.

In one embodiment, the number of receiving nodes may vary over time, as nodes may join or leave a group either due to the application requirements, or due to node crashes, reboots, servicing, etc. Typically, whenever the configuration of a group changes, the windowing parameters such as the designated node to acknowledge set, window size etc. may be adjusted to accommodate these changes. Of course, for a node leaving a group, a graceful exit with the node notifying the other members of such departure is preferred rather than requiring reliance on a timeout or other mechanism to detect the absence of the node.

Also, note, that for some applications, not all receiving node will send an acknowledgment message. For example, there might be some critical nodes which must receive the information, while others may just desire to be informed. Thus, in one embodiment, reliable group communication is performed to less than all nodes (e.g., the critical node) while at least one remaining node receive the messages (e.g., listens to the multicast address) but does not participate in the acknowledgement scheme employed.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for gang scheduling, the method comprising:
a first member of a gang recognizing an event, the gang including the first member and a plurality of other members; and in response to said recognition of the event, the first member sending a multicast dispatch message to the plurality of other members, the multicast dispatch message including an indication of a gang priority level; and
the plurality of other members receiving the multicast dispatch message; and in response: each particular member of the plurality of other members raising a priority level of a process associated with said each particular member to that corresponding to the gang priority level in order to cause an approximate or actual simultaneous response to the multicast dispatch message on each of the plurality of other gang members, and then performing an operation associated with the multicast dispatch message in said process at the gang priority level;
wherein the priority level of the first member is raised to the gang priority level before said sending the multicast dispatch message.

2. The method of claim 1, wherein said performing the operation includes generating one or more results; and wherein said method comprises each particular member of the plurality of other members communicating its respective said one or more results to the first member.

3. The method of claim 2, wherein said operation includes collecting one or more statistics values and said one or more results includes said one or more statistics values.

4. The method of claim 1, wherein the multicast dispatch message includes a set of routing updates, and said operation includes updating a data structure with the set of routing updates.

5. The method of claim 1, wherein the multicast dispatch message includes a fault indication, and said operation includes updating configuration or routing information in response to the fault indication.

6. The method of claim 1, wherein the event includes the detection of a fault, and the operation is a corrective measure associated with the fault.

7. An apparatus having one or more processing elements and memory configured for gang scheduling, the apparatus comprising:
   means for maintaining gang membership of a scheduling gang, said gang membership including a plurality of other gang members; and
   means for dispatching and communicating a particular gang dispatch message to the plurality of other gang members, said particular gang dispatch message including a scheduling priority level; wherein said means for dispatching is configured to raise its priority level to at least the scheduling priority level before sending the particular gang dispatch message to the plurality of other gang members; and
   wherein each of the plurality of other gang members includes: means for receiving said particular gang dispatch message; and means for: in response to said receipt of said particular gang dispatch message: modifying a priority level of a process to the scheduling priority level included in said particular gang dispatch message in order to cause an approximate or actual simultaneous response to said particular gang dispatch message on each of the plurality of other gang members, and then performing an operation corresponding to said particular gang dispatch message in the process at the scheduling priority level included in said particular gang dispatch message.

8. The apparatus of claim 7, wherein said means for dispatching and communicating said particular gang dispatch message includes means for performing reliable group communication.

9. The apparatus of claim 8, wherein said means for reliable group communication includes means for acknowledging less than all of a series of gang dispatch messages.

10. The apparatus of claim 8, wherein said means for reliable group communication includes means for performing immediate and delayed acknowledgement of received said particular gang dispatch message.

11. An apparatus including one or more processing elements and memory, wherein said memory stores one or more instructions that, when executed by said one or more processors, implements processes comprising:
    a first member of a gang; and
    a plurality of other members of the gang;
    wherein the first member is configured to recognize an event, and in response, send a multicast dispatch message to the plurality of other members, the multicast dispatch message including an indication of a gang priority level;
    wherein the plurality of other members are each configured to receive the multicast dispatch message, and in response to said receipt of the multicast dispatch message: to change a processing priority level of a process to that corresponding to the gang priority level including in the multicast dispatch message in order to cause an approximate or actual simultaneous response to the gang dispatch message on each of the plurality of other gang members, and then to perform an operation associated with the multicast dispatch message in the process at the gang priority level; and
    wherein the first member is configured to raise its priority level to at least the gang priority level in response to said recognizing the event and before said sending the multicast dispatch message.

12. The apparatus of claim 11, wherein said performing the operation includes generating one or more results; and wherein said each of the plurality of other members is configured to communicate said one or more results to the first member.

13. The apparatus of claim 12, wherein said operation includes collecting one or more statistics values and said one or more results includes said one or more statistics values.

14. The apparatus of claim 11, wherein each of the plurality of other members of the gang are included on different line cards of a packet switching system.

15. The apparatus of claim 11, wherein the multicast dispatch message includes a set of routing updates, and said operation includes updating a data structure with the set of routing updates.

16. The apparatus of claim 11, wherein the multicast dispatch message includes a fault indication, and said operation includes updating configuration or routing information in response to the fault indication.

17. The apparatus of claim 11, wherein the event includes the detection of a fault, and the operation is a corrective measure associated with the fault.

* * * * *